United States Patent [19]

Patel et al.

[11] Patent Number: 5,379,978
[45] Date of Patent: Jan. 10, 1995

[54] VEHICULAR CONVERTIBLE CUPHOLDER

[75] Inventors: Dennis Patel, Markham; Felix Chang, Willowdale, both of Canada

[73] Assignee: Manchester Plastics, Troy, Mich.

[21] Appl. No.: 191,476

[22] Filed: Feb. 4, 1994

[51] Int. Cl.[6] .................................. A47F 5/00
[52] U.S. Cl. ........................ 248/311.2; 224/281; 224/42.45 R; 297/188.17
[58] Field of Search ............ 248/311.2, 298, 293; 224/281, 42.44, 42.45 R; 297/188, 191, 194

[56] References Cited

U.S. PATENT DOCUMENTS

| | | | |
|---|---|---|---|
| 882,854 | 3/1908 | Weaver . | |
| 3,506,303 | 4/1970 | Smittle et al. | 297/162 |
| 4,417,764 | 11/1983 | Marcus et al. | 297/194 |
| 4,434,961 | 3/1984 | Hoye | 248/311.2 |
| 4,583,707 | 4/1986 | Anderson | 248/293 |
| 4,645,157 | 2/1987 | Parker | 248/311.2 |
| 4,738,423 | 4/1988 | DiFilippo et al. | 248/311.2 |
| 4,828,211 | 5/1989 | McConnell et al. | 248/311.2 |
| 4,892,281 | 1/1990 | DiFilippo et al. | 248/311.2 |
| 4,953,771 | 9/1990 | Fischer et al. | 224/281 X |
| 4,981,277 | 1/1991 | Elwell | 224/281 X |
| 5,014,956 | 5/1991 | Kayali | 248/311.2 |
| 5,052,728 | 10/1991 | Fukumoto | 224/281 X |
| 5,141,194 | 8/1992 | Burgess et al. | 248/311.2 |
| 5,190,259 | 3/1993 | Okazaki | 297/194 X |
| 5,228,611 | 7/1993 | Yabuya | 224/281 |
| 5,284,314 | 2/1994 | Misaras et al. | 297/194 X |

FOREIGN PATENT DOCUMENTS

| | | | |
|---|---|---|---|
| 0050039 | 3/1991 | Japan | 224/281 |
| 4090938 | 3/1992 | Japan | 224/281 |

Primary Examiner—Karen J. Chotkowski
Attorney, Agent, or Firm—Reising, Ethington, Barnard, Perry & Milton

[57] ABSTRACT

A vehicular cupholder assembly (10) is designed to expand in an upward direction out from a sleeve housing (12) enabling the vehicular cupholder assembly (10) to be mounted to instrument panels (14) and armrest cushions alike. A base plate (24) telescopes in a substantially horizontal plane (A) out of the housing (12). A container stabilizing plate (32) moves from a collapsed position adjacent the baseplate (24) to a stabilizing position spaced vertically up and away from the base plate (24). A primary link (42) and a second link (50) maintain the container stabilizing plate (32) in a position parallel to the plane (A).

5 Claims, 2 Drawing Sheets

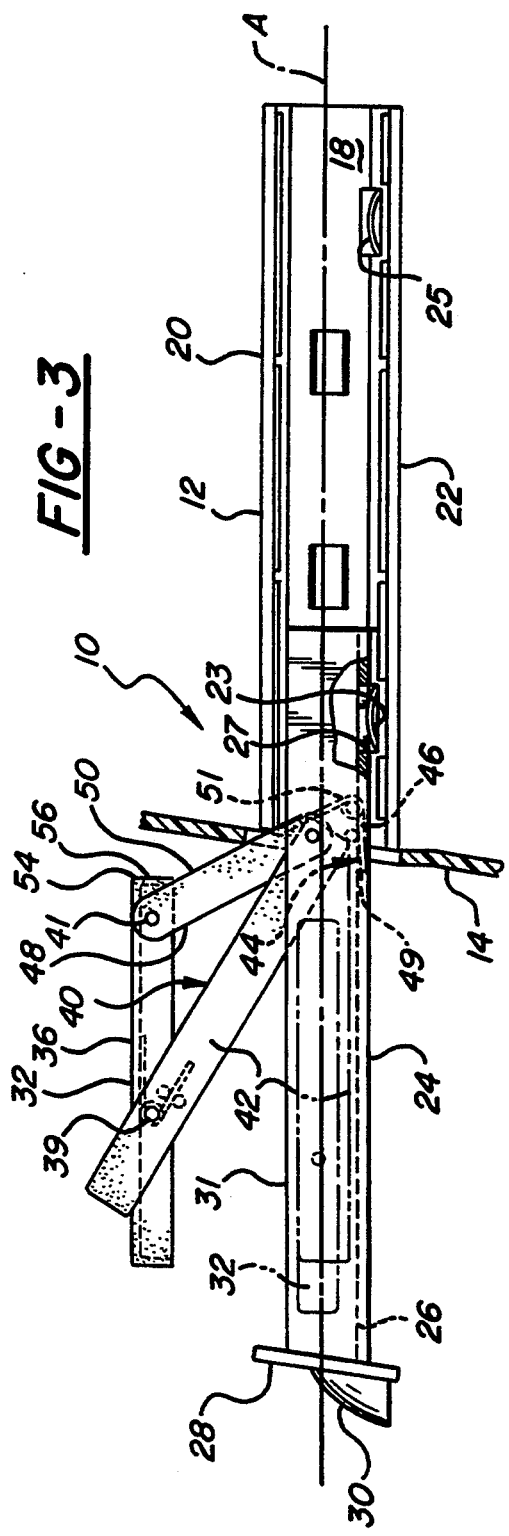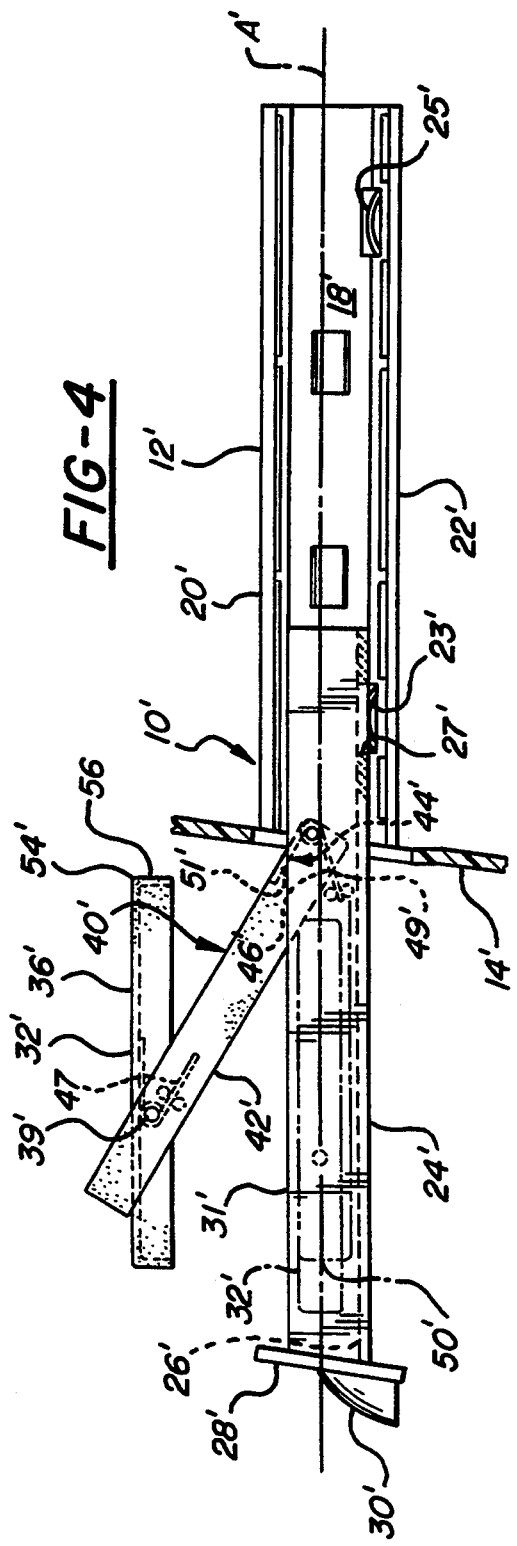

VEHICULAR CONVERTIBLE CUPHOLDER

BACKGROUND ART

1. Technical Field

The subject invention relates to a container holder. More particularly, the subject invention relates to convertible container holders.

2. Description Of Related Art

Vehicular container holders, rapidly becoming standard equipment, are being designed with increasingly more sophistication to insure convenience and stability. U.S. Pat. No. 4,583,707, issued to Anderson on Apr. 22, 1986, discloses a storage holder for a container adapted to be mounted in a seat cushion of a vehicle seat. The cup container holder is secured to the access door of the container holder. The container holder is rotated from the stored position into an access position wherein cups may be placed inside the container holder. If it is desired, the container may be unlatched allowing the container holder to expand to receive a tall container, such as a glass or a bottle. The upper portion of the container is spring biased into the extended position and must be forced down manually before the storage door may be rotated to its storage position after the container holder is no longer needed. Although this storage container holder adequately holds containers of various sizes in a stable manner as required in the vehicular environment, this storage holder is not adapted to be installed in both the arm cushion of a vehicular seat and, at the same time, the instrument panel of the vehicle. Because this design requires a large storage access door, this container holder cannot be placed on the instrument panel as it would take up too much space. Automotive companies are attempting to reduce costs due to inventory and a container holder design which is dedicated to a single part of the vehicle, i.e., the arm cushion or the instrument panel, are not desired.

U.S. Pat. No. 4,892,281, issued to DiFilippo et al. on Jan. 9, 1990, discloses a container holder adapted to be installed in both an arm cushion and an instrument panel. The container holder is telescoped out of a housing wherein a U-shaped support member pivots downwardly once the container holder extends out from the housing. A container is supported by the U-shaped support when it is placed through the hole on the container holder. If, however, the U-shaped support does not extend to the position fully perpendicular to the container holder, a container placed in the container holder may possibly drop through the container holder. Further, a U-shaped support such as that disclosed in U.S. Pat. No. 4,892,281 may result in a spilled beverage more easily due to the U-shaped support breaking in one location. More specifically, there is little or no redundant structure in such design to allow for a container holder to support a container if the U-shaped support fails. Finally, the U-shaped support style cupholder may be secured only to a small portion of an armrest i.e., the upper half thereof, due to the space required for the U-shaped support to rotate downwardly. Some armrest structures would have to be redesigned to include a portion of the support structure extending to the upper half of the cushion to accommodate this U-shaped support style cupholder.

SUMMARY OF THE INVENTION AND ADVANTAGES

The subject invention is a convertible container holding assembly. This assembly comprises a housing which is securable to a structure. A base plate telescopes between a retracted position inside the housing and an extended position outside of the housing. The convertible container holding assembly is characterized by container stabilizing means extendable between a collapsed position adjacent said base plate when in the retracted position and a container stabilizing position spaced above the base plate as the base plate telescopes out of the housing into the extended position. The container stabilizing means stabilizes a container supported on the base plate when the base plate is in the extended position.

The advantages associated with the subject invention include the ability to secure the container holder in either the armrest or the instrument panel of the vehicle resulting in reduced inventory costs. Further, a solid base plate is used to support the container substantially reducing the potential for the beverage spilling due to a broken part or a less visible supporting structure unable to rotate into a position to support a container.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a side view partially cut away of the preferred embodiment of the subject invention in the extended position; and FIG. 4 is a partial cross-sectional side view of an alternative embodiment of the subject invention in the extended position.

DETAILED DESCRIPTION OF THE DRAWINGS

Figure 1:
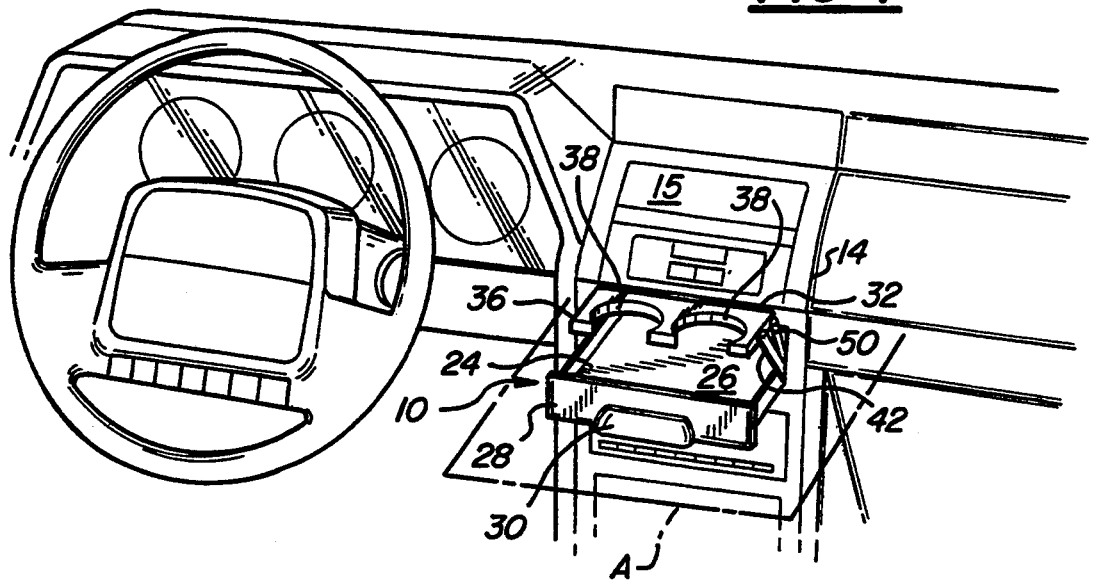
FIG. 1 is a perspective view of the preferred embodiment of the subject invention.
Figure 2:
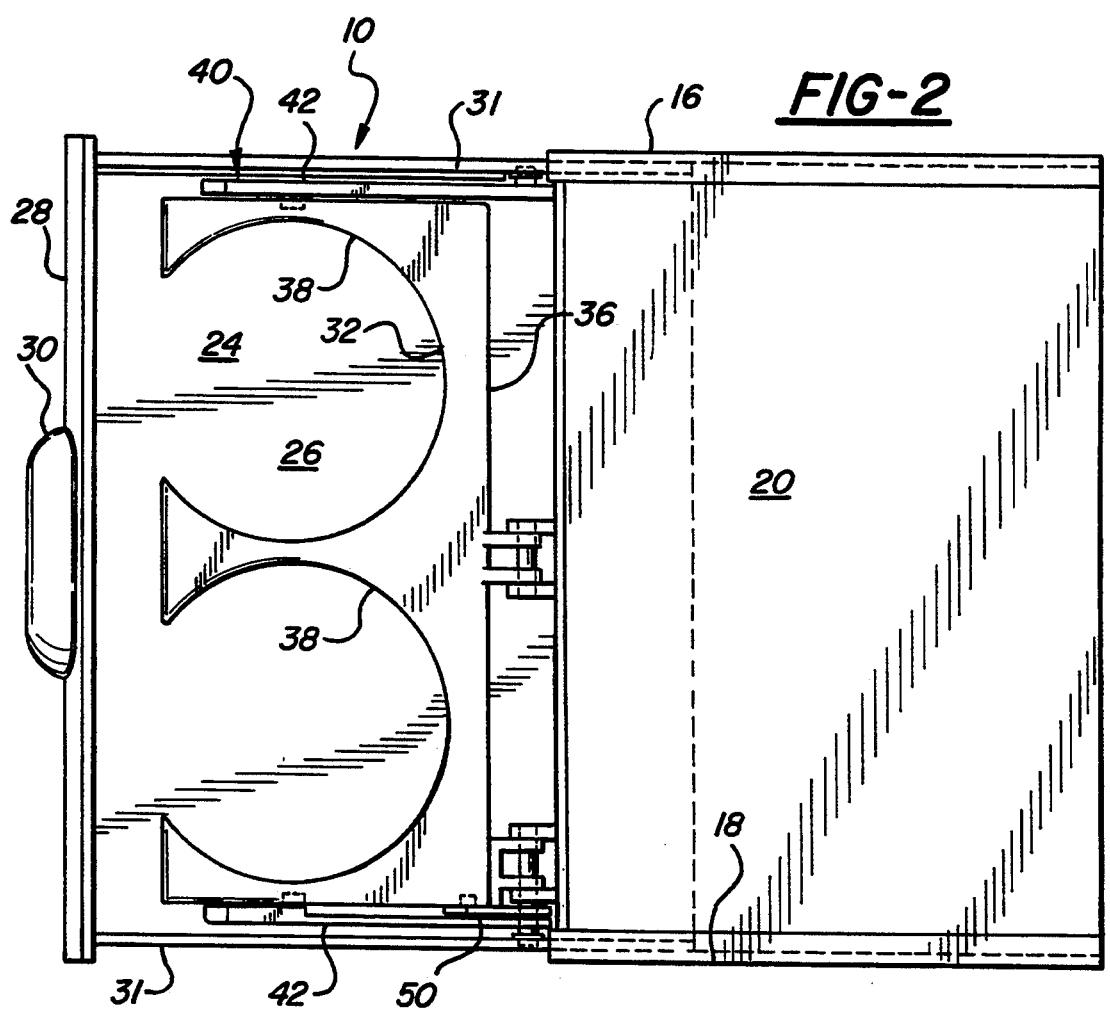
FIG. 2 is a top view of the preferred embodiment of the subject invention in the extended position.

The subject invention is a convertible container holding assembly and is generally indicated at 10 in the figures. The convertible container holding assembly 10 includes a housing 12 which is securable to a structure 14. The housing 12 includes two sides 16, 18, a top face 20 and a bottom face 22. Although not necessary, the housing 12 is rectangular in shape with the two sides 16, 18 being perpendicular to the top 20 and bottom 22 faces. The housing 12 is securable to a structure in the vehicle. In the figures, the structure 14 is an instrument panel 15. However, the structure 14 may also be an arm cushion, door, or any other structure in the vehicle suitable for receiving such a housing 12.

The convertible container holding assembly 10 further includes a base plate 24 having two sidewalls 31 telescoping in a substantially horizontal plane A between a retracted position inside the housing 12 and an extended position outside the housing 12. The base plate 24 may include indentations, i.e., circles, within the face 26 of the base plate 24 to aid in positioning and stabilizing a container stored thereon.

The base plate 24 telescopes or slides into and out of the housing 12 along two tracks (not shown), each fixedly secured to each of the two sides 16, 18. Two protrusions 23,25 extend out of the bottom of the housing 12 which are received by a single aperture 27 in the baseplate 24. The aperture 27 and protrusions 25 lock the base plate 24 in the position associated with the particular protrusion 25. More specifically, when base plate 24 moves from the retracted position to the extended position, the base plate 24 will be locked into the extended position when the outermost protrusion 25 is received by the aperture 27.

An end plate 28 is fixedly secured to the outer edge of the base plate 24 and includes a handle 30 allowing an operator to manually pull the base plate 24 out of its retracted position, inside the housing 12, to the extended position, outside of the housing 12. One skilled in the art may incorporate a motor or a spring loaded device to aid in the moving of the base plate 24 out of the retracted position without adding any new or unobvious results to the subject invention.

The convertible container holding assembly 10 is characterized by container stabilizing means 32 extendable between a collapsed position (shown in phantom) and vertical stabilizing position above the horizontal plane A as the base plate 24 telescopes out of the housing 12 into the extended position for stabilizing a container (not shown) placed on the base plate 24. The container stabilizing means 32 extends upwardly wherein at least a portion of the container stabilizing means 32 is located directly above the base plate 24. In the preferred embodiment, all of the container stabilizing means 32 is located directly above the base plate 24 when the base plate 24 is in the extended position.

The container stabilizing means 32 includes a container stabilizing plate 36 or a top plate 36 having a plurality of holes 38 cut therethrough. The number of holes 38 in the top plate 36 correspond to the number of containers 34 the subject invention 10 is capable of holding. The width of the base plate 24 and, therefore, the number of containers capable of being held by the subject invention 10 is limited only by the space available in the vehicle at the location where the subject invention 10 is being installed.

The container stabilizing means 32 extends to a container stabilizing position up and away from the horizontal plane A of the base plate 24 via linking means, generally shown at 40, which links the container stabilizing means 32 to the base plate 24. The linking means 40 includes a primary linkage 42 between the base plate 24 and the container stabilizing means 32. The primary linkage 42 is linked near the back end of the base plate 24 and a first point 39 near the front end of the top plate 36.

The linking means 40 includes biasing means 44 for biasing the container stabilizing means 32 away from the base plate 24. The biasing means 44 preferably comprises a torsion spring 46 which urges the primary linkage 42 away from the base plate 24 to extend the container stabilizing means 32 out and away from the base plate 24. The torsion spring 46 is a cylindrical spring having two ends 49, 51 extending tangentially out from the coil spring with each end 49, 51 extending out and applying a force against the base plate 24 and parallel means 48, respectively. The parallel means 48 positions the container stabilizing means 32 parallel to the base plate 24 when the base plate 24 is in the extended position. The parallel means 48 includes a second link 50 between the base plate 24 and a second point 41, which is located at a distance from said first point 39, along the predetermined length toward the back of the container stabilizing means 32.

The torsion spring 46 is the only spring required and includes two ends and a cylindrical spring. This torsion spring 46 biases the secondary linkage 50 away from the base plate 24 insuring the maximum separation of the primary 42 and secondary 50 linkages. The primary 42 and secondary 50 linkages are attached to the container stabilizing means 32 such that the container stabilizing means 32 is positioned in a plane parallel to the horizontal plane A when the base plate 24 is in the extended position.

In an alternative embodiment shown in FIG. 4, wherein like primed numerals represent similar parts, the container stabilizing means 32 is held in a plane parallel to the plane A by a second spring 47 which is identical in design to the torsion spring 46 and extends between the container stabilizing means 32 and the primary linkage 42. The second spring 47 negates the need of the second linkage 50, which is removed in this embodiment.

Collapsing means 54 collapses or contacts the container stabilizing means 32 from the perpendicular position to a collapsed position adjacent the base plate 24.

The collapsing means 54 includes an abutment surface 56 disposed on the container stabilizing means 32 structure 14 forcing the torsion springs 46, 52 to contract. The abutment surface 56 is designed to include a surface which will not scratch or otherwise harm the surface of the structure 14. Once the abutment surface 56 contacts the surface of the structure 14 forcing or urging the spring 46 or springs 46',47' to contract, the container stabilizing means 32 is pivoted to a position below the structure 14. The base plate 24 is then able to retract into the housing 12 wherein the subject invention 10 is stored until it is needed again.

The invention has been described in an illustrative manner, and it is to be understood the terminology used is intended to be in the nature of description rather than of limitation.

Many modifications and variations of the present invention are possible in light of the above teachings. Therefore, it is to be understood that within the scope of the appended claims, reference numerals are merely for convenience and are not to be in any way limiting, the invention may be practiced otherwise than as specifically described.

I claim:

1. A convertible container holding assembly (10) comprising:

a housing (12) securable to a structure (14);

a base plate (24) telescoping between a retracted position inside said housing (12) and an extended position outside said housing (12);

container stabilizing means (32) extendable between a collapsed position adjacent said base plate (24) when in said retracted position and a container stabilizing position spaced above said base plate (24) as said base plate (24) telescopes out of said housing (12) into said extended position for stabilizing a container supported on said base plate (24) when said base plate (24) is in said extended position;

a primary link (42) extending between said base plate (24) and said container stabilizing means (32);

a secondary link (50) extending between said base plate (24) and said container stabilizing means (32) such that said base plate (24) and said container stabilizing means (32) are parallel in said extended position; and a torsion spring (52) forcing said secondary link (50) away from said base plate (24) to extend said container stabilizing means (32) out and away from said base plate (24).

2. An assembly (10) as set forth in claim 1 further characterized by collapsing means (54) for collapsing said container stabilizing means (32) from said perpendicular position to said collapsed position adjacent said base plate (24).

3. An assembly (10) as set forth in claim 2 further characterized by said collapsing means (54) including an abutment surface (56) disposed on said container stabilizing means (32) to abut the structure (14) forcing said primary linkage (42) to contract said torsion spring (46).

4. A convertible container holding assembly (10) comprising:

a housing (12) securable to a structure (14), said housing (12) including top (20) and bottom (22) parallel surfaces and sides (16, 18) perpendicular to said top (20) and said bottom (22) surfaces, said bottom surface (22) including a plurality of protrusions (25);

a base plate (24) including a face (26) for supporting a container thereon, said base plate (24) further including an end plate (28), two sidewalls (31), a handle (30), and at least one aperture (27) for receiving said protrusions (25) therein;

a container stabilizing plate (36) having a predetermined length and including at least one hole (38) cut therethrough for receiving the container therein to stabilize the container when supported by said base plate (24);

a first link (42) pivotally secured to said sidewalls (31) and said container stabilizing plate (36) at a first point (39) along said predetermined length;

a second link (50) pivotally secured to said sidewalls (31) and said container stabilizing plate (36) at a second point (41) along said predetermined length; and a coil spring (46) having two ends (49,51) extending tangentially out from said coil spring (46), one (49) of said two ends (49, 51) abutting said face (26) and the other (51) of said two ends (49, 51) abutting said second link (50) biasing said second link (50) away from said base plate (24).

5. A convertible container holding assembly (10) comprising:

a housing (12) securable to a structure (14);

a base plate (24) telescoping between a retracted position inside said housing (12) and an extended position outside said housing (12);

container stabilizing means (32) extendable between a collapsed position adjacent said base plate (24) when in said retracted position and a container stabilizing position spaced above said base plate (24) as said base plate (24) telescopes out of said housing (12) into said extended position for stabilizing a container supported on said base plate (24) when said base plate (24) is in said extended position;

a primary link (42) pivotably secured to said base plate about a pin, said primary link (42) extending between said pin and said container stabilizing means; and a secondary link (50) pivotably secured to said base plate (24) about said pin, said secondary link (50) extending between said base plate (24) and said container stabilizing means (32) such that said base plate (24) and said container stabilizing means (32) are parallel in said extended position.

* * * * *